(No Model.)
A. H. HANEY.
GEARING.
No. 549,786. Patented Nov. 12, 1895.
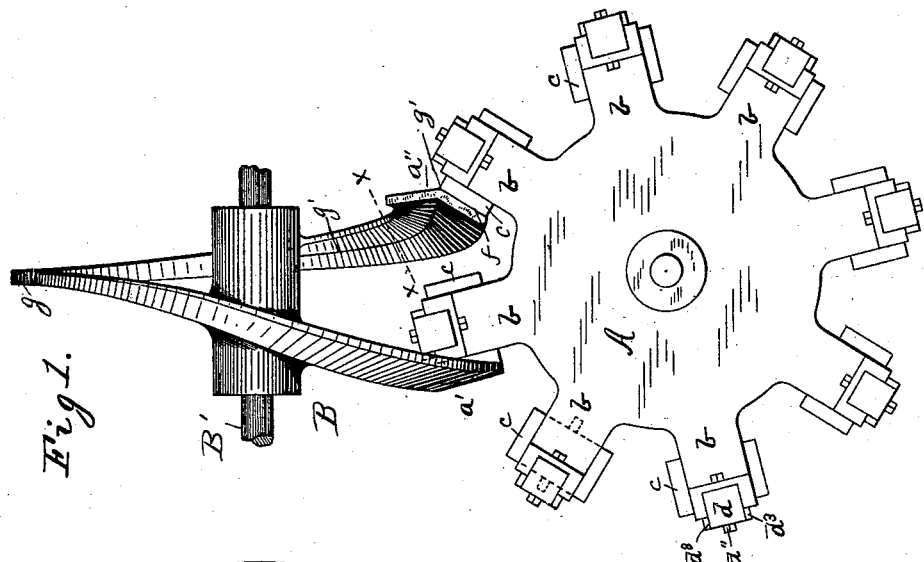
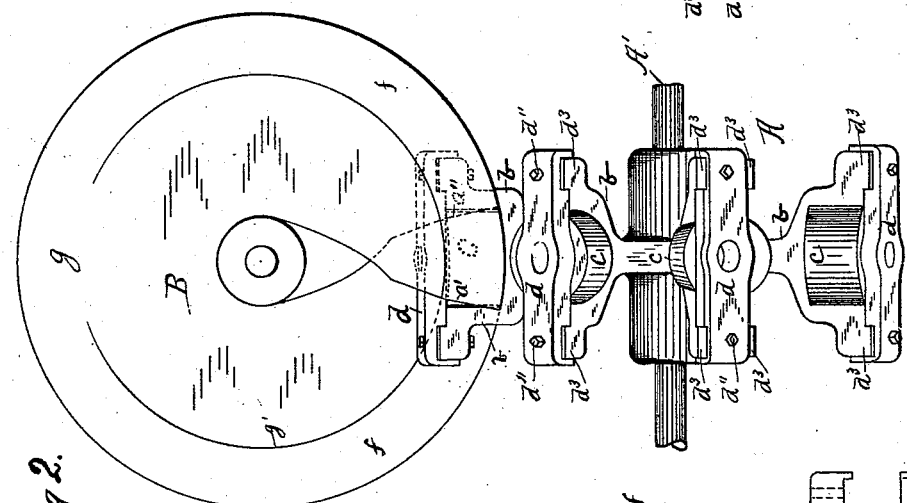
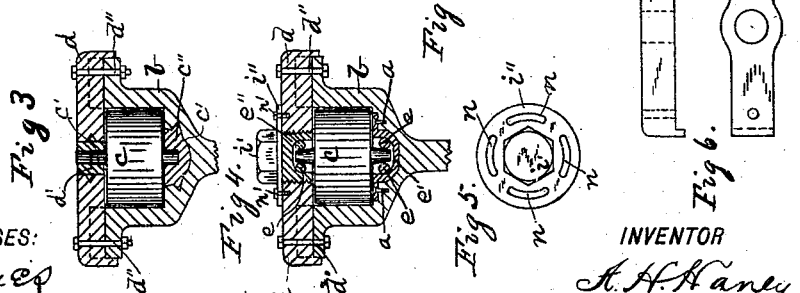
WITNESSES:
Chas. J. Himes
C. J. Longenecker.
INVENTOR
A. H. Haney.
BY
R. J. McCarty.
ATTORNEY.

UNITED STATES PATENT OFFICE.

ADAM H. HANEY, OF DAYTON, OHIO.

GEARING.

SPECIFICATION forming part of Letters Patent No. 549,786, dated November 12, 1895.

Application filed July 27, 1895. Serial No. 557,314. (No model.)

*To all whom it may concern:*

Be it known that I, ADAM H. HANEY, of Dayton, county of Montgomery, State of Ohio, have invented a new and useful Improvement in Gearing; and I do declare the following to be a full, clear, and exact description of the invention, such as will enable others skilled in the art to which it appertains to make and use the same, reference being had to the accompanying drawings, and to the letters of reference marked thereon, which form a part of this specificaion.

The invention relates to improvements in gearing and has a specific reference to improvements in a worm or screw and a worm-wheel, the peculiar features and construction of which will appear in the following specification, taken in connection with the accompanying drawings.

The object of the invention is to provide a system of gearing for driving line or other shafting, in which the friction is reduced to the lowest extent.

Referring to the annexed drawings, upon which similar letters of reference indicate corresponding parts, Figure 1 is an elevation of my improved worm and worm-wheel, the latter appearing in side elevation. Fig. 2 is a view showing the screw or worm in side elevation. Fig. 3 is an axial section through the bearing of one of the rollers of the worm-wheel. Fig. 4 is a similar view showing the shaft of the roller mounted on ball-bearings; Fig. 5, a detail view of the adjusting-flange. Fig. 6 is a side elevation and top view, respectively, used in the construction shown in Figs. 1, 2, and 3. Fig. 7 is a section of the worm on the line $x\,x$, Fig. 1.

The letter A designates a worm-wheel, which is mounted on a line-shaft A, or any driven shaft, from which the power is distributed. This wheel, as is shown, consists of a solid disk with a plurality of integral bearing-arms $b$, projecting radially from its periphery. In each of these arms there is mounted an antifriction-roller $c$, the journals $c'$ of which are mounted in an inner bearing $c''$, consisting, preferably, of Babbitt metal, which is secured to the interior of the arm. The outer bearing for said journals consists of similar metal $d'$, secured in the cap $d$. These caps inclose the outer ends of the arms $b$ and are made secure thereto by bolts $d''$, and being fitted between flanges $d^3$, that project outwardly from the outer ends of the arms. As shown in Fig. 4, the bearing for the roller-journals is still further reduced in friction by being mounted on ball-bearings $e$. The inner bearing $e'$ in this construction consists of hardened steel and is secured to the arm $b$ by jam-nuts $a$. The outer bearing $e''$ is of similar metal and is an integral part of a hexagon nut $i'$ and adjusting-flange $i''$. The object of constructing the bearing $e''$, nut $i'$, and flange $i''$ in one piece is to enable adjustments of said outer bearing from time to time to take up the wear. This adjustment is accomplished by means of the concentric slots $n$ in the flange, through which jam-nuts $n'$ pass to enter the cap $d$. In changing the position of the bearing the jam-nuts $n'$ are loosened and the bearing moved by turning the nut $i'$, after which the jam-nuts are retightened. The letter B designates a screw or worm, which is keyed to a driving-shaft B' at a right angle to the worm-wheel A. As is shown in Figs. 1 and 7, the thread of said worm is angular in cross-section, or the circumferential edge thereof is deflected into a plane coincident with the plane of the rollers, forming a straight bearing-surface $f$, which comes in uniform contact with the entire length of said rollers. This straight surface of the worm or screw grows gradually less from the leading end $a'$ until the center, or the point diametrically opposite said leading end, is reached, at which point it vanishes into a flat surface, as at $g$. From this point the angle of deflection commences, gradually becoming more distinct in angularity until the retiring end $a''$ is reached, where the angle in cross-section is substantially the same as that adjacent to the leading end. The apex of the angle in the retiring half of the worm points in an opposite direction, as at $g'$. The retiring end of the worm maintains a contact with the rollers until the leading end effects a substantial engagement.

As a result of the construction described in the foregoing a uniform pressure is brought to bear upon the rollers $c$, which imparts to the worm-wheel A a steady and continuous movement.

Having described my invention, I claim—

1. The combination with a driving shaft, of a worm or screw the thread of which is angular in cross section, and assumes a straight line midway between its leading and retiring ends as at —g—, a worm wheel mounted at a right angle to said worm or screw, and a series of radial arms projecting from the periphery of said wheel, and a series of antifriction rollers mounted in said arms, substantially as herein shown and described.

2. The combination with a worm wheel provided with a series of radial bearing arms, a series of rollers mounted in said arms, and detachable caps inclosing the ends of said arms and forming bearings for the outer ends of said rollers, of a worm or screw the thread of which is angular in cross section to provide a bearing surface —f— adapted to be in parallel relation with said rollers during the period of contact, substantially as shown and described.

In testimony whereof I have hereunto set my hand this 24th day of July, 1895.

ADAM H. HANEY.

Witnesses:
R. J. MCCARTY,
JOHN W. KNITZER.